United States Patent [19]

Shida et al.

[11] 3,882,096
[45] May 6, 1975

[54] CATALYST FOR AND METHOD OF PREPARING ULTRA HIGH MOLECULAR WEIGHT POLYOLEFINS

[75] Inventors: Mitsuzo Shida, Barrington; Thomas J. Pullukat, Hoffman Estates; Raymond E. Hoff, Palatine, all of Ill.

[73] Assignee: Chemplex Company, Rolling Meadows, Ill.

[22] Filed: Sept. 4, 1973

[21] Appl. No.: 394,330

[52] U.S. Cl. ..... 260/94.9 D; 252/430; 260/94.9 DA
[51] Int. Cl. ........................... C08f 1/66; C08f 3/06
[58] Field of Search ............... 260/94.9 D, 94.9 DI; 252/430

[56] References Cited
UNITED STATES PATENTS

| | | | |
|---|---|---|---|
| 3,365,439 | 1/1968 | Bjornson | 260/94.9 D |
| 3,485,771 | 12/1969 | Horvath | 260/94.9 D |
| 3,622,521 | 11/1971 | Hogan et al. | 260/94.9 D |
| 3,625,864 | 12/1971 | Horvath | 260/94.9 D |
| 3,780,011 | 12/1973 | Pullukat et al. | 260/94.9 D |
| 3,798,202 | 3/1974 | Nasser, Jr. | 260/94.9 D |

*Primary Examiner*—Joseph L. Schofer
*Assistant Examiner*—A. Holler
*Attorney, Agent, or Firm*—Hofgren, Wegner, Allen, Stellman & McCord

[57] ABSTRACT

A catalyst active for polymerizing ethylene to an ultra high molecular weight (UHMW) polymer prepared by forming a hydrogel mixture of a porous support of silica, alumina, zirconia, thoria or mixtures thereof, about 1–200 weight percent of water and chromium oxide in an amount to give about 0.1–50 weight percent of chromium on the support, adding to this mixture an alkyl ester of titanium in an amount to give about 1–130 weight percent of titanium on the support with the ester containing 1–7 carbon atoms in each alkyl group and activating the resulting mixture with a dry gas that contains oxygen and at the customary elevated temperature. An initial reaction product of the titanium ester and water is titanium hydroxide (or hydrated titanium dioxide) formed in the pores of the support. The heat of activating tends to dehydrate this to titanium dioxide. The disclosure also includes the method of making ultra high molecular weight polyethylene by polymerizing monomers containing ethylene under polymerizing conditions with the above catalyst.

13 Claims, No Drawings

3,882,096

CATALYST FOR AND METHOD OF PREPARING ULTRA HIGH MOLECULAR WEIGHT POLYOLEFINS

BACKGROUND OF THE INVENTION

This invention relates to a catalyst for polymerizing ethylene to an ultra high molecular weight polymer and to the method of forming these polymers with this catalyst.

SUMMARY OF THE INVENTION

The catalyst of this invention which is active for polymerizing ethylene to an ultra high molecular weight polymer is prepared by forming a hydrogel mixture of a support that is either silica, alumina, zirconia, thoria or mixtures thereof with about 1–200 weight percent of water and about 0.1–50 weight percent chromium in the form of chromium oxide of which at least about 0.1 weight percent of the chromium is hexavalent chromium followed by adding to this mixture an alkyl ester of titanium in an amount to give about 1–130 weight percent of titanium on the support in which the ester contains 1–7 carbon atoms in the alkyl group thereby forming titanium hydroxide in the pores of the support and forming the corresponding alcohol as a reaction by-product which may be easily driven off as by a distillation process. This is followed by activating the resulting mixture in the usual manner with a dry gas that contains oxygen.

This catalyst may then be used to prepare an ultra high molecular weight polyethylene by polymerizing monomers comprising ethylene under customary polymerizing conditions.

The use of titanium esters of this type to introduce titanium as well as other specified metals onto a porous support but in the absence of water and under gas fluidizing conditions is described and claimed in the copending application of Pullukat and Shida Ser. No. 132,907, filed Apr. 9, 1971, now U.S. Pat. No. 3,780,011 dated Dec. 18, 1973 and assigned to the same assignee as the present application.

The catalyst of this invention has high reactivity so that the preparation of ultra high molecular weight polyethylenes with this catalyst can be done at lower temperatures than previously thought possible. Furthermore, the catalyst of this invention has a very important advantage of producing higher molecular weight polyethylene at any operable temperature than any other catalyst of which applicants are aware.

DESCRIPTION OF THE PREFERRED EMBODIMENTS

Ultra high molecular weight polyethylene is the commercial designation of linear polymers containing ethylene units in which the polymers have molecular weights of about 1,000,000 or higher. These polymers are noted for their impact strength, abrasion resistance and general properties that make them superior to the lower molecular weight polyethylene in many uses such as for making gears, bearings, guide rails and slider beds in conveyors, stress resistant pipes and other similar articles. There have been many other catalysts and methods of making ultra high molecular weight polyethylenes but none have the advantages or the properties of the catalysts and methods of this invention.

Although there are several ways to obtain molecular weight values, a measurement of solution viscosity is often used as a basis to calculate molecular weights. For UHMW the following equation has been so used:

$$[\eta] = 6.77 \times 10^{-4} M^{0.67}$$

In particular it has been employed in the article by A. F. Magiolies, "The Effect of Molecular Weight on the Physical Properties of Linear High Density Polyethylene" presented at the Regional Technical Conference of the Society of Plastics Engineers, Inc. in Baltimore, Oct. 7, 1970.

In the equation $[\eta]$ means the intrinsic viscosity determined in decalin at 130° and M is the molecular weight. FIG. 2 of the scientific work of P. S. Francis, R. C. Cooke, Jr., and J. H. Elliott (Journal of Polymer Science, Vol. 31, 453–466, 1958) shows a similarity between the intrinsic viscosity and the reduced specific viscosity in their relation to molecular weight. The similarity is such that the values of reduced specific viscosity can, with justification, be used to rank samples of UHMW with respect to their ultimately useful physical properties.

In the well known Ziegler catalyst system for producing high molecular weight polyethylene an organometallic reducing agent, such as an aluminum alkyl, is required whereas the catalyst of this invention requires none. Moreover, the Ziegler catalyst frequently contains reactive chloride, such as in titanium tetrachloride, which at all stages of the process and in the product is capable of causing corrosion of metal surfaces.

The carrier or porous support of the catalyst of this invention may be either silica, alumina, zirconia, thoria or mixtures thereof with a large pore support being preferred. The support is first impregnated with about 1–200 weight percent of water which may be accomplished by treating the support with deionized water in an excess of this amount to make a paste and then drying preferably at a temperature of 95°–200°C. to drive off excess water.

The carrier also includes an effective catalytic amount of chromium oxide with at least some of the chromium being in the hexavalent state. The amount of chromium present should be from about 0.1–50 weight percent based on the total weight of the catalyst composition with at least about 0.1 weight percent of this being hexavalent chromium. The catalyst can be prepared by impregnating the support with a solution of the chromium oxide or with a compound that is convertible to the chromium oxide by calcination.

The support plus the chromium oxide is then combined with an alkyl ester of titanium in an amount to give about 1–130 weight percent of titanium in the catalyst with the ester containing 1–7 carbon atoms in each alkyl group.

The mixture resulting from the support or carrier, chromium oxide, water and titanium ester is activated by heating at a usual activating temperature which may be at least about 250°C., preferably from about 600°–900°C. with a practical range being from about 650°–800°C. This activating is preferably for a time of about 1 minute to 48 hours while in contact with a dry gas that contains oxygen of which air is an example.

The proportion of ester to water is at least the stoichiometric ratio of about 1 mol of the ester to about 4 mols of water and there is preferably a small excess of the ester such as about 3.5 weight percent excess of ester over the 1 to 4 ratio. This slight excess is desirable as it increases the reactivity of the catalyst. However, large excesses of titanium ester are of little or no value and therefore are preferably avoided as wasteful.

A support plus chromium oxide composition useful in preparing the catalyst of this invention and practicing the method of this invention is one that is available commercially as Davison 969-MS and produced by Davison Chemical Company. It is prepared by impregnating a porous microspheroidal silica containing about 0.1 weight percent alumina based on the weight of the silica with aqueous chromium trioxide and then drying in a heated atmosphere such as air at a temperature of about 150°–250°C. The final composition prepared in this manner contains about 2.1 weight percent of chromium trioxide, a surface area of 295–365 m²/g and a pore volume of 1.5–2.0 cm³/g.

The above support is ideally suited for preparing the catalyst of this invention because it is quite porous and with a porous support the water can be introduced in an amount substantially equal to the pore volume and does not cause caking or visible dampness. Thus in connection with the Davison 969-MS support up to 200 weight percent of water may be added.

Thus in this invention the water is introduced to the support which already contains the above described effective amount of chromium compound. The addition of the titanium ester to this mixture may be accomplished in any desired way but for conformity of catalyst properties and ease in handling the formation of large lumps should be avoided. Thus the preferred manner is to add the titanium ester slowly while the powdered mixture of the support, chromium compound and water is stirred. The amount of ester added in this manner depends generally upon the amount of water in the carrier because a chemical reaction occurs resulting in the hydrolysis of the titanium ester to titanium hydroxide and the corresponding alcohol.

The larger the amount of water present the greater the amount of titanium hydroxide produced and the higher the resulting molecular weight of the polyethylene produced with the final catalyst. However, it is not feasible to practice this invention with visibly wet catalyst substrates. Consequently, for the above-mentioned Davison 969-MS the maximum water content is about 200 weight percent of the silica weight and, accordingly, the maximum amount of titanium ester is limited to give approximately 135 weight percent titanium with respect to silica weight. Lesser amounts are desirable in many cases to impart the desired reactivity and make polymers of the best molecular weight at the selected polymerization temperature. For other carriers the amounts of water and titanium ester are related to the pore volume in exactly the same way.

After the addition of the titanium ester the combination can be heated and some or all of the alcohol hydrolysis product distilled off. The nature of the alcohol depends, of course, on the particular titanium ester used.

After the alcohol has been removed as by heat distillation the catalyst is activated in the customary way as described above. After being activated the catalytic composition may be used immediately in a polymerization process or can be stored under substantially anhydrous conditions until desired for use. The polymerization process is simply that of contacting the ethylene monomer with an effective catalytic amount of a catalyst in the presence or the absence of diluents or solvents which are known to be suitable. The polymerization process may be under known conditions of temperature, pressure or the like. The polymerization may be conducted in the presence of a hydrocarbon which is liquid under the reaction conditions and which acts as a diluent and not a solvent for polyethylene under the reaction conditions employed. Preferred hydrocarbon diluents are paraffins including cycloparaffins and particularly paraffins and cycloparaffins having 3–12 carbon atoms. Illustrative of diluents are propane, isobutane, n-pentane, isopentane, neopentane, 2,2,4-trimethylpentane, cyclohexane and methylcyclohexane.

The thusly produced catalyst may be used to catalyze the polymerization of ethylene at the customary temperatures of, for example, about 55°–65°C. and requires either no or a very short induction period.

The following examples illustrate the invention:

EXAMPLE 1

The starting catalyst material was Davison 969-MS which has about 2 percent chromium trioxide, surface area 295–365 m²/g and a pore volume of 1.5–2.0 cm³/g. Thirty two grams were mixed with deionized water to make a paste and then dried to a weight of 48 grams. Although this is an increase in weight of 50 percent due to water, the material appeared dry and flowed freely. The powder was then dampened with hexane and while stirring in a flask 50 ml of tetraisopropyl titanate was added. The hexane and isopropyl alcohol reaction product were distilled off leaving a bluish colored powder. This was activated at 750°C. for 5 hours.

A polymerization test with ethylene with this catalyst gives the following:

| Catalyst Wt(g) | Polymerization Temp. | Reactivity g/g/hr | Productivity g/g |
|---|---|---|---|
| 0.1045 | 55°C. | 1220 | 2440 |

The polyethylene product had a reduced specific viscosity of 11.28. An approximate molecular weight of the polyethylene of this example based on the reduced specific viscosity is about 2,000,000.

EXAMPLE 2

Eight grams of Davison 969-MS was dried overnight in an oven at a temperature of 130°C. It was transferred to a dry flask which was purged with $N_2$. A slow flow of $N_2$ was maintained on the flask to exclude moist air. Water in the amount of 1.20 grams (67 millimoles) was added drop by drop while the powder was stirred by an electric mixer so that the water was uniformly distributed and visible lumps did not form. In the same dropwise manner 5.0 ml. of titanium tetraisopropoxide (16.7 millimoles) was added. After addition of the titanium ester the yellow powder was heated while being stirred until the moist look of the isopropyl alcohol was gone and the color of the powder became pale green. Isopropyl alcohol amounting to a 30 percent yield of the theoretical amount was collected during the heating.

The pale green powder was transferred to a quartz tube and fluidized by dry air. The temperature was brought to 100°C. and held for 30 minutes. An additional milliliter of titanium tetraisopropyl titanate was added to the top of this fluidized bed and then the catalyst was activated at 720°C. for 5 hours. Upon cooling the catalyst was flushed with $N_2$ and transferred to a storage flask. The amount of water added in this catalyst preparation was 15 weight percent of the Davison 969-MS and the amount of titanium 12 weight percent. The total titanium ester addition gave an excess of titanium over the stoichiometric ratio to water in the amount of 2.0 weight percent of silica.

In a polymerization test 0.2468g of the activated catalyst was charged to a pressure vessel at a temperature of 40°C. 500 milliliters of isobutane and ethylene to give a constant pressure of 550 psig were introduced. There was an initial exotherm and, afterwards, there was either a constant flow of ethylene into the reactor or heat rise due to polymerization. There was no detectable induction period. After 2 hours and 15 minutes the reactor was opened and 112 grams of polyethylene had been made which had a reduced specific viscosity of 14.83. The productivity of the catalyst was 455 grams per gram, and the molecular weight of the product about 3,000,000.

EXAMPLE 3

Eight grams of 969-MS was dried in a fluidized condition with $N_2$ for 2½ hours at 100°C. It was then transferred to a $N_2$ purged flask and treated with water and titanium tetraisopropoxide as in Example 2, except the amount of water was 2.4 grams and the amount of titanium ester in the first stage 10 milliliters. After collecting 8.3 ml of isopropyl alcohol by distillation the blue-green powder was put into a quartz tube. It was fluidized with air and kept at 100°C. for 1 hour. Then an additional 1.0 ml of titanium tetraisopropoxide was added. The catalyst was activated for 5 hours at 650°C.

The amount of the materials in this example based on the weight of Davison 969-MS were 30 weight percent water and 22 weight percent titanium, with the excess titanium being 2.25 weight percent.

A polymerization test was done with this catalyst at 58°C. in the same manner as in Example 2. The amount of catalyst was 0.1802g and the reaction time 1 hour and 15 minutes. There was a 4 minute induction period. In this test the catalyst productivity was 800 g/g and the reduced specific viscosity of the polymer was 8.90. The polyethylene, therefore, had a molecular weight of approximately 1,400,000.

Having described our invention as related to the embodiments set out herein, it is our intention that the invention be not limited by any of the details of description, unless otherwise specified, but rather be construed broadly within its spirit and scope as set out in the appended claims.

We claim:

1. A catalyst active for polymerizing ethylene to an ultra high molecular weight polymer, prepared by forming a hydrogel mixture of a porous support of the class consisting of silica, alumina, zirconia, thoria and mixtures thereof, about 1–200 weight percent of water, and chromium oxide in an amount to give about 0.1–50 weight percent of chromium on said support of which at least about 0.1 weight percent is hexavalent chromium, adding to said mixture an alkyl ester of titanium in an amount to give about 1–130 weight percent of titanium, said ester containing 1–7 carbon atoms in the alkyl group, and activating the resulting mixture with a dry gas that contains oxygen.

2. The catalyst of claim 1 wherein the preparation of said hydrogel mixture comprises mixing water with a mixture of said support and said chromium oxide and drying to achieve said 1–200 weight percent of water.

3. The catalyst of claim 2 wherein said drying is at a temperature of about 95°–200°C.

4. The catalyst of claim 1 wherein said support comprises silica.

5. The catalyst of claim 1 wherein said ester and water are in a ratio of about 1 mol of the ester to about 4 mols of water.

6. The catalyst of claim 5 wherein said ester is in an excess of about 3.5 weight percent over said 1 to 4 ratio.

7. The catalyst of claim 1 wherein at least some of the corresponding alcohol reaction product resulting from the hydrolysis of said alkyl ester of titanium by said water is expelled by heating the catalyst mixture prior to said activating.

8. The method of making an ultra high molecular weight polyethylene which comprises polymerizing monomers comprising ethylene under polymerizing conditions with the catalyst of claim 1 and recovering the ultra high molecular weight polyethylene.

9. The method of claim 8 wherein the preparation of said hydrogel mixture comprises mixing water with a mixture of said support and said chromium oxide and drying to achieve said 1–200 weight percent of water at a drying temperature of about 95°–200°C.

10. The method of claim 8 wherein said support comprises silica.

11. The method of claim 8 wherein said ester and water are in a ratio of about 1 mol of the ester to about 4 mols of water.

12. The method of claim 11 wherein said ester is in an excess of about 3.5 weight percent over said 1 to 4 ratio.

13. The method of claim 8 wherein at least some of the corresponding alcohol reaction product resulting from the hydrolysis of said alkyl ester of titanium by said water is expelled by heating the catalyst mixture prior to said activating.

* * * * *